(12) United States Patent
Hibino et al.

(10) Patent No.: US 7,517,563 B2
(45) Date of Patent: Apr. 14, 2009

(54) HOSE OF IMPERMEABILITY AND A PROCESS FOR MANUFACTURING THE SAME

(75) Inventors: Motoshige Hibino, Minokamo (JP); Kazutaka Katayama, Komaki (JP); Ayumu Ikemoto, Komaki (JP); Hidehito Ikeda, Kasugai (JP); Hiroaki Ito, Kasugai (JP)

(73) Assignee: Tokai Rubber Industries, Ltd., Komaki-shi, Aichi-ken (JP)

( * ) Notice: Subject to any disclaimer, the term of this patent is extended or adjusted under 35 U.S.C. 154(b) by 554 days.

(21) Appl. No.: 11/194,453

(22) Filed: Aug. 2, 2005

(65) Prior Publication Data

US 2005/0268979 A1 Dec. 8, 2005

Related U.S. Application Data

(60) Division of application No. 10/618,594, filed on Jul. 15, 2003, now abandoned, which is a continuation of application No. 09/739,768, filed on Dec. 20, 2000, now abandoned.

(30) Foreign Application Priority Data

| Dec. 27, 1999 | (JP) | ................................. 11-368709 |
| Mar. 16, 2000 | (JP) | ............................. 2000-079375 |

(51) Int. Cl.
*B05D 1/06* (2006.01)
(52) U.S. Cl. ........................................ 427/482; 427/485
(58) Field of Classification Search ................. None
See application file for complete search history.

(56) References Cited

U.S. PATENT DOCUMENTS

| 4,800,928 A | 1/1989 | Kanao |
| 4,862,924 A | 9/1989 | Kanao |
| 4,976,289 A | 12/1990 | Umemori et al. |
| 5,398,729 A * | 3/1995 | Spurgat ....................... 138/133 |
| 5,776,570 A * | 7/1998 | Murakami et al. .......... 428/36.8 |

(Continued)

FOREIGN PATENT DOCUMENTS

EP 0530507 A1 3/1993

(Continued)

*Primary Examiner*—Frederick J Parker
(74) *Attorney, Agent, or Firm*—Jacobson Holman PLLC

(57) ABSTRACT

A hose of impermeability has a wall corrugated along at least a part of its length, and formed by an inner thin resin layer, a laminated layer including a metal film, or a layer formed by a metal film, and an outer thin resin layer. It has a very high fluid impermeability owing to its wall layer including or formed by a metal film, and is also very flexible, capable of absorbing vibration, light in weight and strong. A tubular inner thin resin layer is formed by extrusion as the innermost layer of a multi-layered hose wall, and a laminated tape including a metal film, or simply a metal film is spirally wound or longitudinally lapped about the inner resin layer.

An outer thin resin layer is formed about a layer formed by the laminated tape, or metal film, and the whole is at least partly corrugated. Alternatively, corrugation is done before an outer thin resin layer is formed by electrostatic powder coating. A different process includes applying a laminated tape including a metal film about a mandrel to form a tubular laminated layer, and after removing the mandrel, coating the inner surface of the tubular layer with a resin powder electrostatically to form a thin resin layer thereon.

2 Claims, 4 Drawing Sheets

U.S. PATENT DOCUMENTS

| | | |
|---|---|---|
| 5,839,478 A | 11/1998 | Colcombet et al. |
| 6,049,658 A | 4/2000 | Schave et al. |

FOREIGN PATENT DOCUMENTS

| | | |
|---|---|---|
| EP | 0888877 A1 | 1/1999 |
| EP | 0895013 A2 | 2/1999 |
| JP | 07156314 | 5/1995 |
| JP | 07275981 | 10/1995 |
| JP | 08127101 | 5/1996 |
| JP | 10156979 | 6/1998 |
| JP | 11264488 | 9/1999 |
| JP | 2000146037 | 5/2000 |

\* cited by examiner

HOSE OF IMPERMEABILITY AND A PROCESS FOR MANUFACTURING THE SAME

This is a divisional application of Ser. No. 10/618,594 filed on Jul. 15, 2003 now abandoned, which in turn is a continuation of Ser. No. 09/739,768 filed on Dec. 20, 2000, now abandoned.

BACKGROUND OF THE INVENTION

1. Field of the Invention

This invention relates to a hose of impermeability and a process for manufacturing the same. More particularly, it relates to a hose having a very high level of fluid impermeability and satisfactory flexibility, strength and lightness in weight, and a process for manufacturing the same.

2. Description of the Related Art

Various kinds of rubber hoses have usually been used as, for example, fuel hoses in motor vehicles because of their ability to absorb vibration and their flexibility for assembly. They have, however, come to be replaced in recent years by hoses formed from resinous materials having a higher fuel impermeability than rubbers, since the fuel impermeability of hoses is important for environmental protection. Hoses formed from fluororesins have, among others, been preferred because of their particularly high fuel impermeability.

The fluororesins are, however, so expensive that it has been considered that they have to be used in the form of laminates with other materials that are less expensive. The formation of laminates requires special techniques, such as tetraetch treatment or plasma treatment, for the bonding of layers, and equipment therefor. The control on the permeation of fuel through the walls of hoses is expected to become still stricter, while it is also necessary to consider measures against the permeation of other fluids including carbon dioxide used as a refrigerant and hydrogen used in fuel cells. The hoses formed solely from organic materials, such as rubbers and resins including fluororesins, may not be able to satisfy the future requirement for fluid impermeability.

It has, therefore, been proposed that hoses have in their wall a barrier layer of a metal expected to have a very high fluid impermeability. For example, Japanese Patent Application Laid-Open No. 127101/1996 discloses a composite hose for hot or waste water having a wall formed of layers of polybutene, modified polyolefin and a metal. This hose is, however, designed for use in a building and does not, therefore, take into account any such factor as absorption of vibration, flexibility, gasoline resistance, or the resistance of its resin layers to hydrogen used in fuel cells. The hose of the type for which this invention is intended is, however, required to be capable of absorbing vibration, flexible for assembly, strong and light in weight, as well as having a high fluid impermeability.

Japanese Patent Application Laid-Open No. 275981/1995 discloses a resin-coated and corrugated hose made by coating a straight metal pipe with a resin layer, and corrugating the pipe and the resin layer by e.g. drawing or hydroforming. It also discloses a process for manufacturing such a hose. Although it intends to make a hose flexible and capable of absorbing vibration by corrugating it, the corrugation of a straight metal pipe and a resin layer covering it together has the drawback that the residual stress in the resin layer makes it difficult to retain the shape of the metal layer unless the metal layer has a relatively large thickness. The reason is that since up to about 20% of deformation is laminated tape wound about the resin layer; still in the range of elastic deformation for the resin, while it is already in the range of plastic deformation for the metal. In fact, the examples described therein show a metal layer thickness of 0.2 to 0.7 mm against a resin layer thickness of 0.5 to 1 mm. A metal layer having such a large thickness unavoidably adds to the cost of the hose and its weight and lowers its flexibility and its capability of absorbing vibration.

SUMMARY OF THE INVENTION

It is, therefore, considered that a fluid-impermeable composite metal-resin hose can effectively be made by using as a barrier layer a laminated layer obtained by protecting a thin metal film with a resin film, and reinforcing it with a resin layer. The hose preferably has a corrugated portion which ensures its flexibility. This invention provides such a composite metal-resin hose.

There are two problems to be considered in connection with the manufacture of such a composite hose. The first problem is concerned with the adhesion between the laminated layer and the resin layer lining it, which is important to ensure the fluid impermeability of the hose. This problem can occur irrespective of whether the hose may have a corrugated portion, or not. It is technically difficult to form the laminated layer as a seamless cylindrical body and there is no alternative but to form a cylindrical laminated layer by the spiral winding or longitudinal lapping of a laminated tape formed from a thin metal film and a resin film. This method, however, has three problems:

(1) The laminated layer may fail to make a tight seal because of a clearance formed by a step between every two overlapping edges of the laminated tape wound about the resin layer;

(2) The laminated layer may be low in durability if the overlapping edges of the laminated tape are displaced from each other by the bending or deformation of the hose; and (3) A step of applying an adhesive to the outer periphery of the resin layer is required for enhancing its adhesion to the laminated layer to overcome the above two problems, and lowers the efficiency of hose manufacture. This invention provides a process which can overcome these problems.

The second problem is concerned with a metal layer having an undesirably large thickness for a corrugated composite metal-resin hose as pointed out in connection with the disclosure of Japanese Patent Application Laid-Open No. 275981/1995. The inventors of this invention have succeeded in forming a metal layer having a thickness not exceeding, say, 50 μm, while retaining its fluid impermeability, for a corrugated hose made by laminating the metal layer and a resin layer. The hose can be made by (a) placing a corrugated resin layer in a hydroforming die, inserting a metal pipe therein and hydroforming the whole; or (b) hydroforming a metal pipe into a corrugated shape and forming a resin layer on the metal layer by electrostatic powder coating.

According to a first aspect of this invention, there is provided a hose having a wall corrugated along at least a part of its length, and comprising an inner thin resin layer, a laminated layer formed by disposing a metal film between two resin films and surrounding the inner thin resin layer, and an outer thin resin layer surrounding the laminated layer. The hose is of high strength owing to a multi-layered wall, and also because it has a corrugated portion which is highly resistant to collapsing. Therefore, it does not require any resin layer having an undesirably large thickness to ensure its strength. It is sufficient for each resin layer to have a thickness not exceeding, say, 5 mm, so that it may be possible to avoid any undesirable increase in weight of the hose. The metal film is protected by the resin films when the hose is corrugated. Even if it may be of very small thickness, the metal film is not damaged when stretched or bent for the corrugation of the hose, but forms a barrier layer of high fluid impermeability. The inner resin layer forms a reliable seal at a hose joint and the outer resin layer ensures the strength of the hose.

According to a second aspect of this invention, there is provided a process for manufacturing a hose of impermeability which comprises the steps of extruding an inner thin resin layer about a mandrel to form an innermost layer of the hose; winding a laminated tape obtained by holding a thin metal film between two resin films about the inner resin layer to form a laminated layer surrounding it; and the following step (a) or (b):

(a) forming an outer thin resin layer about the laminated layer by extrusion or electrostatic powder coating to complete a multi-layered wall of the hose, and corrugating the wall along at least a part of its length; or (b) corrugating a wall of the hose including the inner resin layer and the laminated layer along at least a part of its length, and then forming an outer thin resin layer about the laminated layer by electrostatic powder coating to complete a multi-layered wall of the hose. The force of a corrugating device does not act directly upon the metal film, but is mitigated by the resin films between which it is held, or even by the inner and outer resin layers between which the laminated layer is located. The stretching or bending of the metal film which occurs during the step of corrugation occurs only after the corresponding deformation of the resin films, or layers, and does not, therefore, cause any damage to the metal film, even if its thickness may be very small. The metal film forms a barrier layer of very high fluid impermeability even if it may have a thickness of less than 200 μm to make the hose flexible, capable of absorbing vibration and light in weight. The metal film may even have a usually unexpected thickness of less than 20 μm and ensure the high fluid impermeability of the hose.

According to a third aspect of this invention, there is provided a hose having a wall corrugated along at least a part of its length and comprising an inner thin resin layer, a thin metal layer surrounding it and an outer thin resin layer surrounding the metal layer. The hose is of high strength, since it has a corrugated portion which is highly resistant to collapsing. Therefore, it does not require any resin layer having an undesirably large thickness to ensure its strength. It is sufficient for each resin layer to have a thickness not exceeding, say, 5 mm, so that it may be possible to avoid any undesirable increase in weight of the hose. The metal layer is protected by the inner and outer resin layers against any damage, and forms a barrier layer of high fluid impermeability. The inner resin layer forms a reliable seal at a hose joint and the outer resin layer ensures the strength of the hose.

According to a fourth aspect of this invention, there is provided a process for manufacturing a hose of impermeability which comprises the steps of extruding an inner thin resin layer about a mandrel to form the innermost layer of the hose; winding a metal film about the inner resin layer to form a thin metal layer thereon; forming an outer thin resin layer about the metal layer by extrusion or electrostatic powder coating to complete a multi-layered wall of the hose; and corrugating the wall along at least a part of its length. The metal layer is held between the inner and outer resin layers, so that no force of a corrugating device may act directly upon the metal layer. Therefore, the metal layer may have even a thickness of less than 200 μm and yet form a barrier layer of very high fluid impermeability.

According to a fifth aspect of this invention, there is provided a process for manufacturing a hose of impermeability which comprises the steps of winding a laminated tape composed of a metal film and a resin film about a mandrel to form a tubular laminated layer; and applying a resin by electrostatic powder coating to the inner surface of the laminated layer after the removal of the mandrel therefrom to form a thin resin layer as the innermost layer of the hose. The laminated layer including the metal film forms a wall of very high fluid impermeability. The metal film may be small in thickness, since it is protected by the resin film against damage or fracture when the hose is bent or deformed. The resin layer lining the tubular laminated layer enables the metal film to have a sufficiently small thickness to make the hose flexible for assembly, strong and light in weight. Other advantages of the process include the following. Firstly, the resin layer formed by electrostatic powder coating fills completely the clearance formed by any step between the overlapping edges of the laminated film wound to form the tubular laminated layer, so that the laminated layer may form an improved seal against any fluid. Secondly, such a resin layer adheres closely to the laminated layer, so that the hose may form a reliable seal against any fluid, while the laminated layer is of improved durability. No adhesive is necessary.

The above and other features and advantages of this invention will become more apparent from the following description and the accompanying drawings.

DETAILED DESCRIPTION OF THE INVENTION

Figure 1:
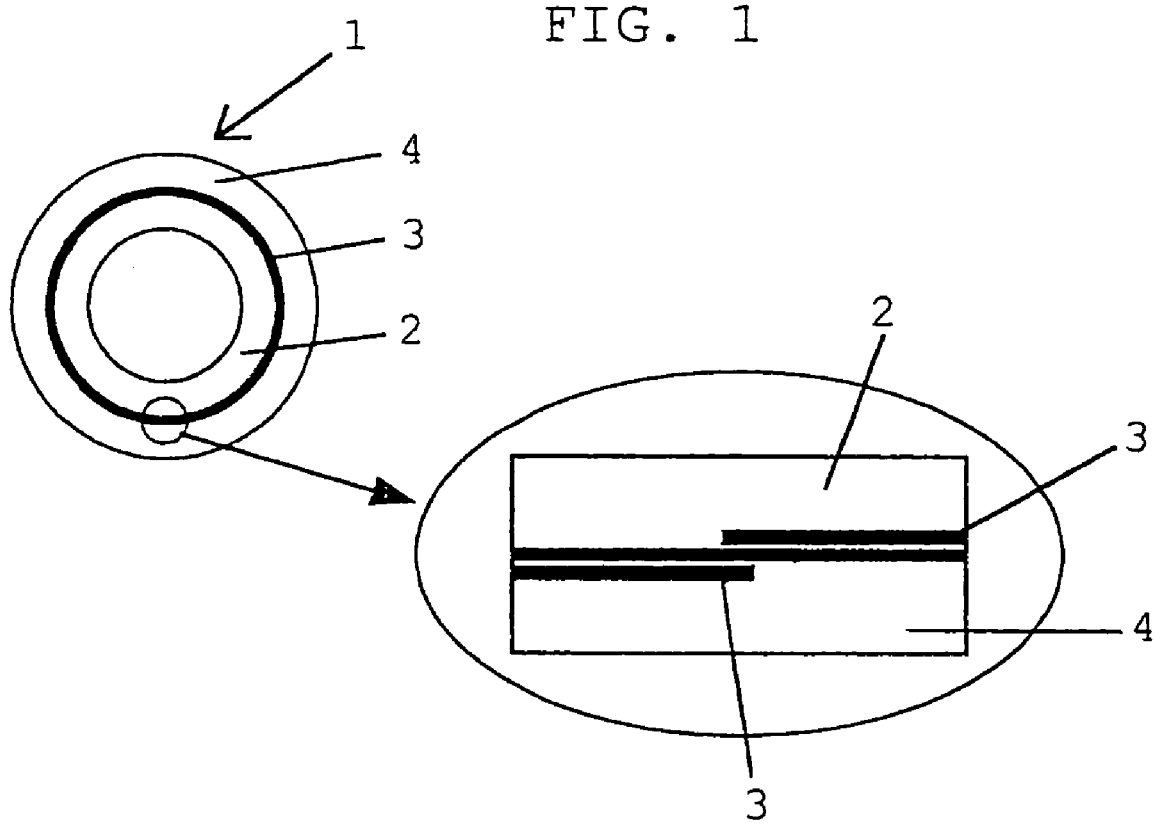
FIG. 1 is a cross sectional view of a hose embodying this invention with a partial enlargement thereof.

The hose according to the first or third aspect of this invention has a multi-layered wall corrugated along at least a part of its length (the remainder being a straight or curved portion having a smooth surface) and formed by an inner thin resin layer, a barrier layer surrounding it and an outer thin resin layer surrounding the barrier layer. The barrier layer is a laminated layer including a metal film between two resin films, or consists solely of a metal film.

The wall may further include a protective layer surrounding the outer resin layer. A typical example is a solid or spongy elastomer layer surrounding the hose along a part of its length (e.g. its corrugated portion), or along its entire length for making it resistant to chipping by a stone hit by a vehicular wheel.

The hose may be used for conveying various kinds of liquids or gases, including fuel such as gasoline for a motor vehicle, alcohol or hydrogen for a fuel cell and natural or propane gas for domestic use, a refrigerant such as Freons or carbon dioxide, and air for a motor vehicle. The hose according to this invention is particularly suitable as, for example, a filler hose, since its wall has a high fluid impermeability, and since electrostatic powder coating employed for forming its resin layers is suitable for application to a hose having a large diameter.

The laminated layer may be of any construction if it is a tubular layer in which a metal film is tightly held between two resin films, though it is preferably formed by spiral winding or longitudinal lapping from a laminated tape made by bonding the metal film with the resin films. The metal film may be of any metal, though it is preferably of aluminum, copper, stainless steel or iron, since these materials are outstanding in one or more of properties including fluid impermeability, ductility and deformability. Aluminum is, among others, preferred. The metal film is not limited in thickness, but preferably has a thickness of from 7 to less than 200 µm to be satisfactory in fluid impermeability, while ensuring the flexibility of the hose. The laminated tape may be of any thickness, but its thickness preferably does not exceed 200 µm to ensure that any clearance between the overlapping edges of the tape as wound or lapped be tightly sealed. The resin films may be of any resin, but are preferably of a thermoplastic resin. A polyamide resin is preferred because of easy adhesion between one portion of the laminated tape and another, and between the laminated layer and the inner or outer resin layer, as well as the ease of corrugation. The resin films and the resin layers are preferably of the same resin, and more preferably of a polyamide resin. Each resin film preferably has an outer surface (i.e. a surface to be adhered) given corona discharge treatment for improved adhesion.

The barrier layer consisting solely of a metal film may be formed in any way, though it is preferably formed by spiral winding or longitudinal lapping. The metal film may be of any metal and thickness, though it is preferably a film of aluminum, copper, stainless steel or iron (particularly aluminum) having a thickness of from 7 to less than 200 µm for the reasons as stated above in connection with the laminated layer.

The inner resin layer formed by extrusion and the outer resin layer formed by extrusion or electrostatic powder coating may both be of any resin. Preferred examples are, however, a polyamide resin, an ethylenevinyl alcohol copolymer (EVOH) resin, a polyester resin, a modified polyolefin resin and a fluororesin. A polyamide resin is, among others, preferred. The inner and outer resin layers may be of the same, or different resins. A silane-crosslinked, or acid- or hydroxyl-modified polyethylene resin is a preferred modified polyolefin resin. The hose is required to be highly resistant to heat if it is used as a fuel, air or coolant hose in an engine room. If such is the case, the resin layers are preferably of PET, PBT, PA6 or aromatic nylon because of their high heat resistance. Other preferred examples are fluororesins including THV, PVDF, ETFE, PTFE, PFA, FEP and an ethylene trifluoride-vinylidene fluoride copolymer. The hose is required to withstand a high temperature and a high humidity if it is used in a place where it is exposed to hot steam. If such is the case, preferred examples of resins are a modified polyethylene resin and a polyamide resin having a low water-absorbing capacity, such as PA11, PA12 or aromatic polyamide. The resin layers may be of very small thickness for the reasons stated before. For example, the inner or outer resin layer, or both may have a thickness not exceeding 5 mm. It is, however, not desirable for the inner resin layer to have a thickness of less than 40 µm to ensure the reliability of a seal at a hose joint, nor is it desirable for the outer resin layer to have a thickness of less than 50 µm to ensure the strength of the hose.

Reference is made to FIG. 1 showing a hose 1 having a multi-layered wall as described above. Its wall is corrugated along at least a part of its length, though not shown as such, and the remainder thereof, if any, is a straight or curved portion having a smooth surface. The wall has an inner thin resin layer 2 and a barrier layer formed around it by double longitudinal lapping with a barrier sheet 3. The barrier sheet 3 is a laminated tape composed of metal and resin films, or consists solely of a metal film. The barrier sheet 3 is surrounded by an outer thin resin layer 4. The outer resin layer 4 may be surrounded by a protective layer consisting of a layer of an appropriate material, such as rubber, a resin or reinforcing fibers, or a combination of materials. The inner resin layer 2, barrier sheet 3, and outer resin layer 4 are bonded to one another with an adhesive, and the circumferentially extending overlapping portions of the barrier sheet 3 are likewise bonded together.

The processes according to the second and fourth aspects of this invention are basically the same except the construction of a barrier layer. An inner thin resin layer is formed by extrusion about a mandrel. A barrier layer is formed about the inner resin layer by applying either a laminated tape including a metal film held between two resin films, or simply a metal film. Then, an outer thin resin layer is formed about the barrier layer by extrusion or electrostatic powder coating, whereby a hose is obtained. The hose is at least partly corrugated. According to the second aspect of this invention, it is alternatively possible to corrugate at least partly a tubular body as formed by applying a laminated tape and thereafter form an outer resin layer by electrostatic powder coating.

A typical process for electrostatic powder coating includes the steps of coating a surface electrostatically with a thermoplastic resin powder and melting the powder under heat, though any other process can be employed if it can form a uniform layer from a resin powder. A multi-layered resin layer may be formed by repeating electrostatic powder coating.

Any method can be used for applying a laminated tape, or metal film to form a barrier layer if it can form a tight tubular layer. Spiral winding or longitudinal lapping is, however, preferred for a quick job and a tight seal. Spiral winding means winding a tape spirally about a tubular body, and longitudinal lapping means enclosing a tubular body in a tape, or sheet extending along its longitudinal axis.

The laminated tape or metal film is preferably so wound as to have overlapping edge portions having an adequate width to ensure a reliable fluid seal. An improved seal can be formed if two or more overlapping layers are formed by spiral winding or longitudinal lapping. This is possible by employing two or more tapes, or films, or a tape, or film having a large width and thereby making it possible to form overlapping edge portions having a large width.

The wall layers, as well as the overlapping portions of the barrier layer, are preferably bonded together to ensure an improved seal. In this connection, it is effective to coat the outer surface of the inner resin layer with an adhesive before winding the tape or film thereon, as well as coating the tape or film with an adhesive before forming the outer resin layer. The overlapping portions of the barrier layer can be bonded together with an adhesive. If the barrier layer is formed by a laminated tape, its resin films and the inner and outer resin layers can be fused together under heat after the hose is made.

The hose may be corrugated by any method, for example, using rolls. It is, however, preferable to corrugate the pipe by hydroforming, i.e. applying a liquid pressure to the interior of the hose in a die. The hose to be corrugated is preferably heated to a temperature of, say, 80° C. so that the resin layers (and the resin films in the barrier layer) may be softened to some extent.

Figure 2A:
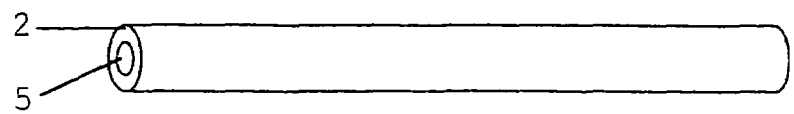
FIGS. 2A to 2F are diagrams illustrating a process embodying this invention in a simplified pattern.
Figure 2B:
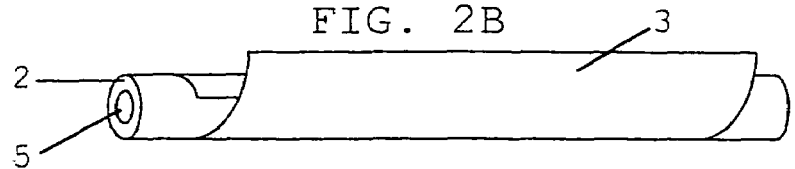
Figure 2C:
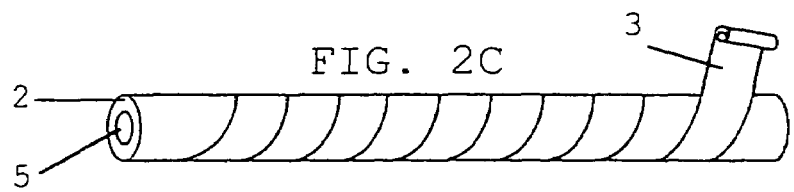
Figure 2D:
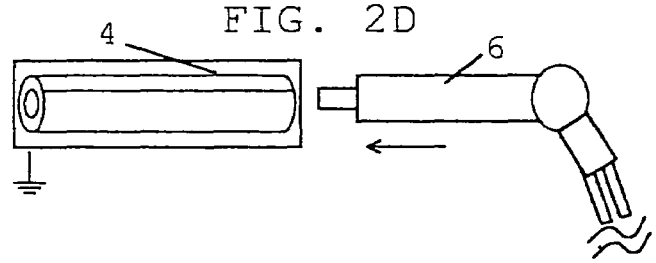
Figure 2E:
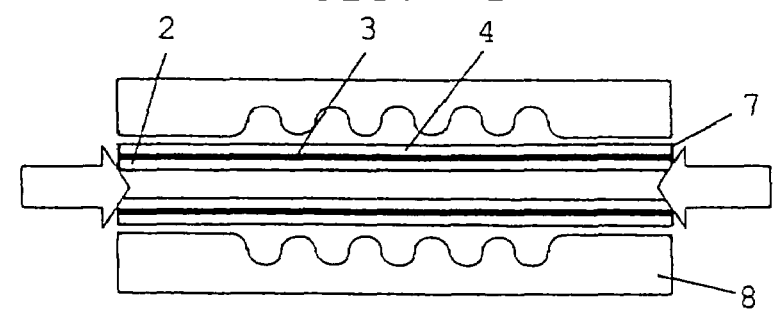
Figure 2F:
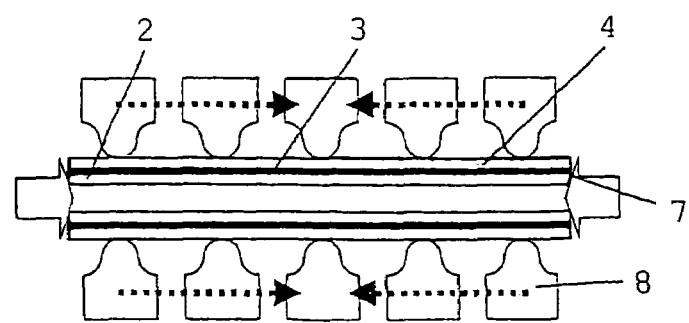

Attention is now directed to FIGS. 2A to 2F illustrating the process according to the second or fourth aspect of this invention. An inner thin resin layer 2 is formed by extrusion about a mandrel 5 in an extruder not shown, as shown in FIG. 2A. A barrier layer is formed about the inner resin layer 2 by lapping it with a barrier sheet 3 as shown in FIG. 2B, or by winding a tape 3 spirally as shown in FIG. 2C. Then, an outer thin resin layer 4 is formed about the barrier layer 3 by extrusion or electrostatic powder coating, whereby a hose is made. If the latter method is employed, a resin powder is applied onto the barrier layer by an electrostatic coating gun 6, and melted under heat to form the outer resin layer 4, as shown in FIG. 2D. After the mandrel 5 is removed from it, the hose 7 is placed in a hydroforming die 8, as shown in FIG. 2E or 2F, and a liquid pressure is applied into the hose 7 to corrugate it along at least a part of its length. The die 8 shown in FIG. 2F is a split die consisting of an upper and a lower portion each having five separate elements which are movable to and away from one another as shown by broken arrows. The hose 7 to be corrugated may be heated to some extent, so that the resin may be softened. The process may further include adequate steps of bonding the layers, or the overlapping portions of the barrier layer 3 with an adhesive, or under heat, as described before.

The process according to the fifth aspect of this invention includes the steps of winding a laminated tape composed of metal and resin films about a mandrel to form a tubular laminated layer, and coating the inner surface of the tubular laminated layer with a resin powder electrostatically after the removal of the mandrel therefrom to form a thin resin layer as the innermost layer of a multi-layered wall for a hose. It may further include other adequate steps, such as a preferably covering step to be described later. A tubular part for a hose assembly may be connected to the tubular laminated layer before the resin layer is formed.

Referring to the step of forming as tubular laminated layer, the laminated tape is preferably composed of a metal film and two resin films bonded together adhesively or under heat to hold the meal film therebetween, though any other type of tape can be used if it is a laminate of metal and resin films. The metal film may be of any metal, though aluminum, copper, titanium or stainless steel is preferred because of their fluid impermeability, ductility or deformability. Aluminum is, among others, preferred. The meal film is not particularly limited in thickness, though a thickness of, say, 7 to 50 µm may be preferred for the flexibility of the hose and the fluid impermeability of the metal film. The laminated tape as a whole is not limited particularly in thickness, either, though a thickness of, say, 30 to 200 µm may be preferred to ensure a reliable seal between the overlapping portions, as discussed before. The resin films may be of any resin layer which is formed on the inner surface fo the laminated layer, as well as a protective layer covering it, if any. The resin films, the inner resin layer and the protective layer are preferably of the same resin. Each resin film preferably has its outer surface treated for improved adhesion, as by corona discharge treatment. The laminated layer may be formed by any method if it is a tight tubular layer. Spiral winding or longitudinal lapping is, however, preferred for a quick job and a tight seal. The layer is preferably so formed as to have overlapping edge portions having an adequate width to ensure an effective fluid seal, and those overlapping portions are preferably bonded to each other to ensure that the tubular laminated layer remain in good shape even after the removal of the mandrel therefrom. The mandrel may be any appropriate round bar, or tube having an outside diameter corresponding to the inside diameter of the hose to be made. The mandrel is preferably used when an outer protective layer is formed by extrusion, too.

The resin layer forming the innermost wall layer of the hose is preferably formed after any tubular part for a hose assembly is connected to the tubular laminated layer, so that the resin layer may cover the inner surface of any such part, too. It is formed by an electrostatic powder coating process which typically includes the steps of coating the surface electrostatically with a thermoplastic resin powder and melting the powder under heat, though any other process can be employed if it can form a uniform layer on the inner surface of the tubular laminated layer from a resin powder. A multi-layered resin layer can be formed by repeating such a process. The resin powder is preferably of, for example, a polyamide, ethylene-vinyl alcohol copolymer (EVOH), polyester, modified polyolefin, or fluoro resin. If the resin films in the barrier layer are of a polyamide resin, the powder is preferably of the same resin, too. A silane-crosslinked, or acid- or hydroxyl-modified polyethylene resin is a preferred modified polyolefin resin. If the hose is required to be highly resistant to heat as when it is used as a fuel, air or coolant hose in an engine room, the resin layer is preferably formed from a powder of, for example, PA6, PET, PBT a chlorotrifluoroethylene-vinylidene fluoride copolymer THV or PVDF because of their high heat resistance. If the hose is intended for use in a place where it will be exposed to hot steam, the resin layer is preferably formed from, for example, a modified polyethylene resin or a polyamide resin having a low water-absorbing capacity, such as PA11, PA12 or aromatic polyamide, because of their resistance to high temperature and humidity. The resin layer cannot be of any definite thickness, but its thickness may depend on the resin forming it and the purpose for which the hose will be used. For example, however, it may have a thickness of about 20 to 200 µm if it is of a polyamide resin, about 40 to 300 µm if it is of a modified polyolefin resin, or about 20 to 100 µm if it is of a fluororesin.

The preferable covering step is the step of forming a protective layer of e.g. a resin or rubber on the outer surface of the tubular laminated layer. It may be carried out before the resin layer is formed on the inner surface of the tubular laminated layer, or thereafter. It is, however, efficient to form the protective layer by extrusion before removing the mandrel for forming the inner resin layer. The protective layer may be of any appropriate material and construction. It may, for example, be a rubber or resin layer, or a layer composed of two rubber layers between which a layer of spirally wound or braided reinforcing yarns is held. It may be formed by, for example, an appropriate combination of extrusion or injection molding and yarn braiding. If a rubber layer is formed by extrusion or injection molding, its curing is usually required. If the protective layer is of rubber, it is preferably formed from, for example, hydrin rubber, NBR-PVC, a composite of halogenated butyl rubber and EPDM (ethylene-propylene-diene rubber), a composite of fluororubber and NBR-PVC, or EPDM to ensure adhesion to the tubular laminated layer, particularly if the resin films in the laminated layer are of a polyamide resin. A protective layer of a resin may be formed from a thermoplastic resin by extrusion. It is preferably formed from, for example, a polyamide resin such as PA6, PA11 or PA12, a modified polyethylene resin (PE), a composite of PE and modified PE, a modified polypropylene resin (PP), a composite of PP and modified PP, or a composite of modified PP and SANTOPRENE (a thermoplastic elastomer formed from PP and EPDM), particularly if the resin films in the laminated layer are of a polyamide resin. If the hose is required to be resistant to heat or hot steam, the layer is preferably of a resin having a high resistance to heat or moisture as mentioned before.

Figure 3:
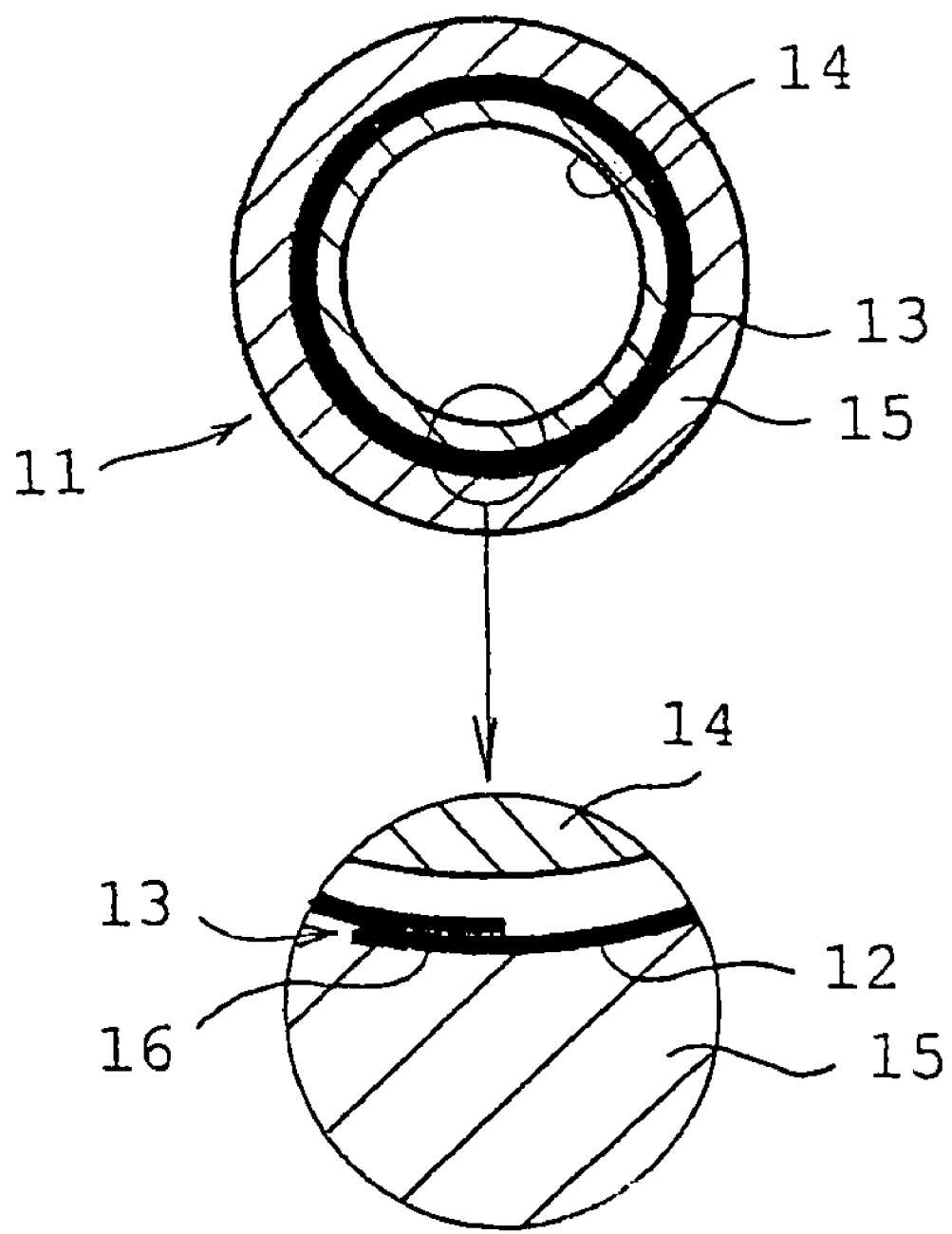
FIG. 3 is a view similar to FIG. 1, but showing a different form of hose embodying this invention.

Reference is now made to FIG. 3 showing a hose made by the process according to the fifth aspect of this invention. The hose 11 has a multi-layered wall including a tubular laminated layer 13 formed by a laminated tape 12 composed of metal and resin films, and a thin resin layer 14 formed by electrostatic powder coating on the inner surface of the laminated layer 13. The laminated layer 13 is surrounded by a protective layer 15 formed from an appropriate material, such as rubber, a resin, reinforcing yarns, or a combination thereof. The laminated layer 13 is formed by longitudinal lapping, and has a pair of overlapping edge portions 16 bonded to each other with an adhesive.

Figure 4A:
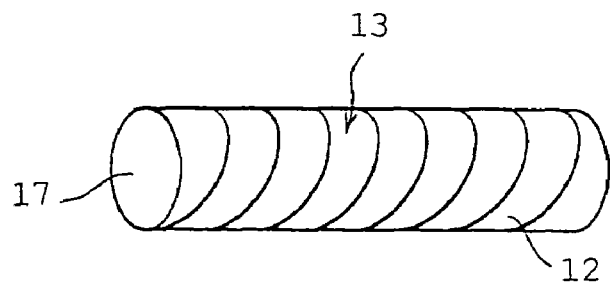
FIGS. 4A to 4D are diagrams illustrating a different process embodying this invention.
Figure 4B:
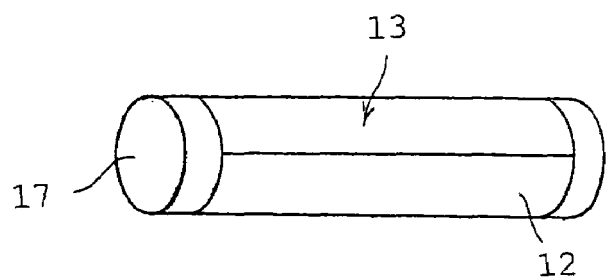
Figure 4C:
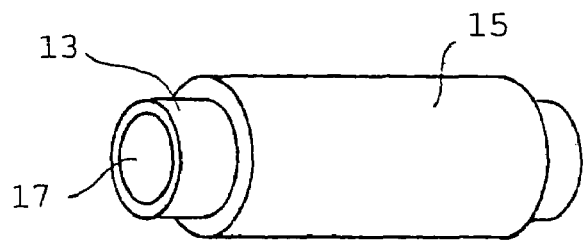
Figure 4D:
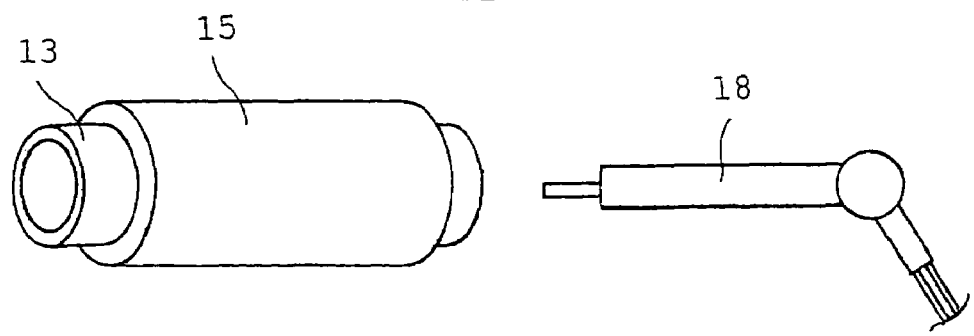

FIGS. 4A to 4D illustrates a mode of carrying out the process according to the fifth aspect of this invention. A laminated tape 12 is applied about a mandrel 17 in an extruder not shown to form a tubular laminated layer 13 by spiral winding as shown in FIG. 4A, or by longitudinal lapping as shown in FIG. 4B. A protective layer 15 is formed by extrusion to cover the laminated layer 13 on the mandrel 17, as shown in FIG. 4C. If the protective layer 15 contains rubber, it is cured, and if it includes reinforcing yarns, they are braided. Then, the mandrel 17 is pulled out from the laminated layer 13, and a resin powder is applied onto the inner surface of the laminated layer 13 by an electrostatic coating gun 18, as shown in FIG. 4D. A tubular part for a hose assembly not shown may be connected to the laminated layer 13 prior to electrostatic powder coating, so that the inner surfaces of the laminated layer 13 and the hose assembly may be coated together with the resin powder. Then, the resin powder is melted under heat to form a resin layer as shown at 14 in FIG. 3.

EXAMPLES

The invention will now be described in further detail by specific examples. Description will first be made of two sets of examples covering the first to fourth aspects of this invention. [Hoses Having an Outer Resin Layer Formed by Electrostatic Powder Coating]

Hoses having smooth surfaces were made as described at Examples 1-1 to 1-6 below. Then, they were corrugated to make corrugated hoses of impermeability as described at Examples 1-7 to 1-11. The hose according to Example 1-6 was not corrugated because of the cracking of its aluminum film.

Example 1-1

A tubular layer of nylon 6 having a wall thickness of 200 μm was formed by extrusion about a resin mandrel having a diameter of 25 mm. A polyurethane-based adhesive (Hibon® of Hitachi Chemical Polymer Co., Ltd.) Was applied onto the outer surface of the nylon layer. The nylon layer was longitudinally lapped with a doubly wound laminated tape composed of an aluminum film having a thickness of 20 μm held between two films of nylon 6 each having a thickness of 25 μm. the laminated tape had a pair of overlapping edge portions bonded to each other with the same adhesive to form a tubular laminated layer. The laminated layer was electrostatically coated with a powder of PA11 (Rilsan-find-powder of Atofina Chemicals, Inc.), and the powder was heated to form a thin resin layer having a thickness of 70 μm, whereby a hose was made.

Example 1-2

A hose was made by employing an aluminum film having a thickness of 9 μm and otherwise repeating Example 1-1.

Example 1-3

A hose was made by employing an aluminum film having a thickness of 6 μm and otherwise repeating Example 1-1.

Example 1-4

A hose was made by employing an aluminum film having a thickness of 20 μm without any resin film holding it, and otherwise repeating Example 1-1.

Example 1-5

A hose was made by employing an aluminum film having a thickness of 9 μm and otherwise repeating Example 1-4.

Example 1-6

A hose was made by employing an aluminum film having a thickness of 6 μm and otherwise repeating Example 1-4.

Example 1-7

A hose having a length of 300 mm was cut from the hose made in Example 1-1, and was corrugated to make a corrugated hose of impermeability having a ridge height of 2 mm and a ridge pitch of 4 mm by an ordinary hydroforming process in which a maximum liquid pressure of 200 kgf/cm$^2$ was employed, while the hydroforming die and liquid were heated to a temperature of 150° C.

Example 1-8

A corrugated hose was made by employing the hose made in Example 1-2 and otherwise repeating Example 1-7.

Example 1-9

A corrugated hose was made by employing the hose made in Example 1-3 and otherwise repeating Example 1-7.

Example 1-10

A corrugated hose was made by employing the hose made in Example 1-4 and otherwise repeating Example 1-7.

Example 1-11

A corrugated hose was made by employing the hose made in Example 1-5 and otherwise repeating Example 1-7.

[Hoses Having an Outer Resin Layer Formed by Extrusion]

Hoses having smooth surfaces were made as described at Examples 2-1 to 2-6 below. Then, they were corrugated to make corrugated hoses of impermeability as described at Examples 2-7 to 2-11. The hose according to Example 2-6 was not corrugated because of the cracking of its aluminum film.

Example 2-1

A tubular layer of nylon 6 having a wall thickness of 200 μm was formed by extrusion about a resin mandrel having a diameter of 25 mm. A polyurethane-based adhesive (Hibon® of Hitachi Chemical Polymer Co., Ltd.) was applied onto the outer surface of the nylon layer. The nylon layer was longitudinally lapped with a doubly wound laminated tape composed of an aluminum film having a thickness of 20 μm held between two films of nylon 6 each having a thickness of 25 μm. The laminated tape had a pair of overlapping edge portions bonded to each other with the same adhesive to form a tubular laminated layer. Then, a layer of nylon 6 having a thickness of 200 μm was formed by extrusion about the tubular laminated layer, and fused thereto by the heat of extrusion.

Example 2-2

A hose was made by employing an aluminum film having a thickness of 9 μm and otherwise repeating Example 2-1.

Example 2-3

A hose was made by employing an aluminum film having a thickness of 6 μm and otherwise repeating Example 2-1.

Example 2-4

A hose was made by employing an aluminum film having a thickness of 20 μm without any resin fil holding it, and otherwise repeating Example 2-1.

Example 2-5

A hose was made by employing an aluminum film having a thickness of 9 pm and otherwise repeating Example 2-4.

Example 2-6

A hose was made by employing an aluminum film having a thickness of 6 μm and otherwise repeating Example 2-4.

Example 2-7

A hose having a length of 300 mm was cut from the hose made in Example 2-1, and was corrugated to make a corrugated hose of impermeability having a ridge height of 2 mm and a ridge pitch of 4 mm by an ordinary hydroforming process in which a maximum liquid pressure of 200 kgf/cm² was employed, while the hydroforming die and liquid were heated to a temperature of 150° C.

Example 2-8

A corrugated hose was made by employing the hose made in Example 2-2 and otherwise repeating Example 2-7.

Examples 2-9

A corrugated hose was made by employing the hose made in Example 2-3 and otherwise repeating Example 2-7.

Examples 2-10

A corrugated hose was made by employing the hose made in Example 2-4 and otherwise repeating Example 2-7.

Examples 2-11

A corrugated hose was made by employing the hose made in Example 2-5 and otherwise repeating Example 2-7.

[Evaluation of Hoses for Impermeability]

A fluid impermeability test was conducted on each of the hoses and corrugated hoses which had been made as described above, except those of Examples 1-6 and 2-6 which had cracked in their aluminum films. A steel pipe having an outside diameter of 25.5 mm and a wall thickness of 0.5 mm and capable of being connected with another was press fitted in each end of the hose to be tested, and secured thereto with an adhesive and a worm gear clamp. The hose was plugged at one end, and supplied with gasoline through the other end. After it was held at a pressure of 0.5 MPa for 24 hours, the hose was visually inspected for any leakage of gasoline at its joints with the steel pipes. Even if no leakage was found, the hose was organoleptically checked for any smell of gasoline. No leakage was found with any hose, but a smell of gasoline was perceived from the products of Examples 1-3, 1-9, 2-3 and 2-9.

Description will now be made of a set of examples covering the fifth aspect of the invention.

Example 1

A laminated tape was prepared by holding an aluminum film having a thickness of 9 μm between two films of nylon 6 each having a thickness of 25 μm. It was wound by longitudinal lapping about a resin mandrel having a diameter of 25 mm to form a tubular laminated layer having a pair of appropriately wide overlapping edge portions. The overlapping edge portions were bonded to each other with a polyurethane-based adhesive (Hibon® of Hitachi Chemical Polymer Co., Ltd.). Then, a hydrin rubber layer having a thickness of 2 mm was formed about the laminated layer by extrusion, and cured to make a hose. After the mandrel had been removed, the hose had its inner surface coated electrostatically with a powder obtained by freezing and crushing commercially available EVOH pellets (EVAL® of Kuraray Co., Ltd.) and was heated, so that the powder might be melted to form a thin resin layer, whereby a hose of impermeability was made.

Example 2

Example 1 was repeated for forming a laminated layer and bonding its overlapping edge portions together. A layer of brominated butyl rubber having a thickness of 0.3 mm and a layer of EPDM having a thickness of 1.7 mm were formed by extrusion about the laminated layer. Example 1 was repeated for curing, mandrel removal, electrostatic EVOH powder coating and heating to form a thin resin layer, whereby a hose was made. The hose had its inner surface coated electrostatically with a powder of PA11 (Rilsan-fine-powder of Atofina Chemicals, Inc.) and the powder was heated to form another thin resin layer, whereby a hose of impermeability was made. The hose had two thin resin layers in its wall.

Example 3

A laminated film was prepared by holding an aluminum film having a thickness of 9 pm between an inner film of nylon 6 and an outer film of nylon 11 each having a thickness of 25 pm. It was spirally wound about a resin mandrel having a diameter of 25 mm for forming a laminated layer and its overlapping edge portions were bonded together. A layer of PA11 having a thickness of 0.9 mm and containing 7% by weight of a plasticizer was formed by extrusion about the laminated layer. Example 2 was thereafter repeated for forming two film resin layers, whereby a hose of impermeability was made.

Example 4

A hose was made by forming a layer of PA11 by electrostatic powder coating and heating, and otherwise repeating Example 3.

Example 5

A laminated film according to Example 3 was used for forming a laminated layer by longitudinal lapping and bonding its overlapping edge portions together as in Example 1. A hydrin rubber layer was formed about it by extrusion, and cured, whereby a hose was made. The hose was cut into a length of 200 μm. A degreased steel pipe having an outside diameter of 25.5 mm and a length of 10.2 mm and capable of being connected to another was coated with a primer (Rilprim® of Atofina Chemicals, Itc.) on the inner surface of its end portion having a length of 20 mm, and was press fitted in each open end of the hose. After the steel primer, the hose and the steel pipe had their inner surfaces coated electrostatically with a powder of PA11 (Rilsan-fine-powder of Atofina Chemicals, Itc.) And the powder was heated to form a thin resin layer, whereby a hose of impermeability was made in the form of a hose assembly.

Comparative Example 1

A hose was made by forming only a single thin resin layer and otherwise repeating Example 2.

Reference Example 1

A laminated tape was prepared by holding an aluminum film having a thickness of 20 μm between two films of nylon 6 each having a thickness of 50 μm. Example 1 was repeated for longitudinal lapping and edge bonding. Example 2 was repeated for forming two protective layers and curing them. After the removal of the mandrel, Example 1 was repeated for forming a thin rein layer by electrostatic powder coating, whereby a hose of low permeability was made.

[Evaluation of Hoses]

(Sealing)

Each hose, except the product of Example 5, was cut into a length of 200 mm and a steel as in Example 5 was press fitted in each end of the hose. Each hose, including the product of Example 5, was secured by a worm gear clamp. The hose was plugged at one end, and supplied with water through the other end. After 30 seconds at a pressure of 0.4 Mpa, the hose was visually inspected for any blotting with water (wetting), or leakage (dropping of water) at its joints with the steel pipes. No blotting or leakage was found on any of the products of Examples 1 to 5, though leakage was found on the product of Comparative Example 1, and blotting on that of Reference Example 1.

(Inner Surfaces of Hoses Filled with Fuel)

The procedures as described above for evaluation on sealing were followed for connecting steel pipes to each hose. The hose was filled with Fuel C containing 50% by volume of toluene and 50% by volume of isooctane and after 168 hours of aging at 40° C., the inner surface of the hose was visually inspected. Nothing wrong was found on any hose, except the product of Comparative Example 1 in which a clearance was found between the overlapping portions of the laminated layer.

While the invention has been described by way of its preferred embodiments, it is to be understood that variations or modifications may be easily made by those skilled in the art without departing from the scope of this invention which is defined by the appended claims.

What is claimed is:

1. A process for manufacturing a hose of impermeability comprising the steps of:
   extruding an inner resin layer about a mandrel;
   applying a laminated tape having a metal film held between two resin films to an outer surface of the inner resin layer to form a laminated layer; and
   forming an outer resin layer about the laminated layer by extrusion or electrostatic powder coating to complete a multi-layered wall, and corrugating the wall along at least a part of its length, or
   corrugating a hose structure composed of the inner resin layer and the laminated layer along at least a part of its length, and forming an outer resin layer by electrostatic powder coating about the laminated layer to complete a multi-layered wall.

2. A process for manufacturing a hose of impermeability comprising the steps of:
   extruding an inner resin layer about a mandrel;
   applying a metal film onto an outer surface of the inner resin layer to form a metal layer thereabout;
   forming an outer resin layer on an outer surface of the metal layer by extrusion or electrostatic powder coating to complete a multi-layered wall;
   each of the inner resin layer and the outer resin layer having a thickness not exceeding 5 mm; and
   corrugating the wall along at least a part of its length.

* * * * *